Oct. 4, 1966  C. D. CUPP  3,276,034
PROTECTIVE SHIELD ATTACHMENT FOR FACE MASKS
Filed Sept. 11, 1964  2 Sheets-Sheet 1
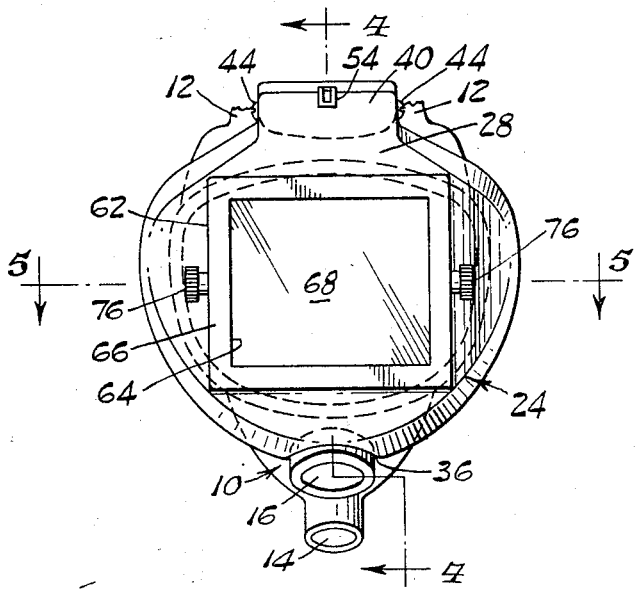
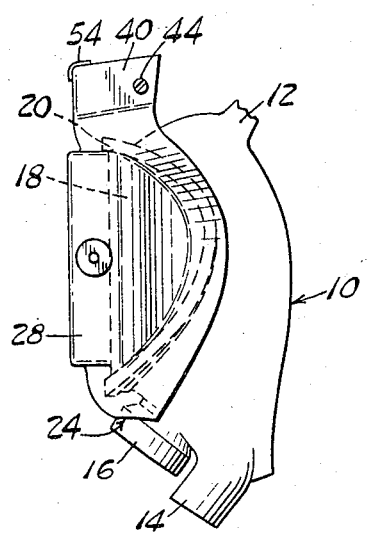
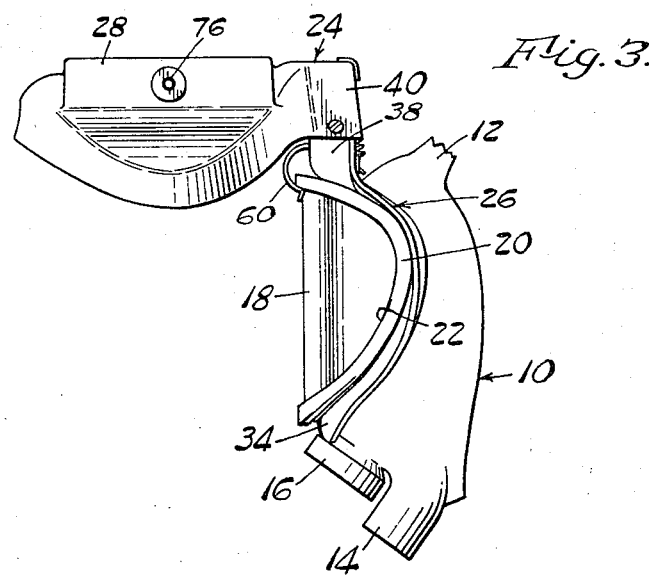
INVENTOR.
CHARLES D. CUPP
BY
Christel + Bean
ATTORNEYS.

Oct. 4, 1966  C. D. CUPP  3,276,034
PROTECTIVE SHIELD ATTACHMENT FOR FACE MASKS
Filed Sept. 11, 1964  2 Sheets-Sheet 2
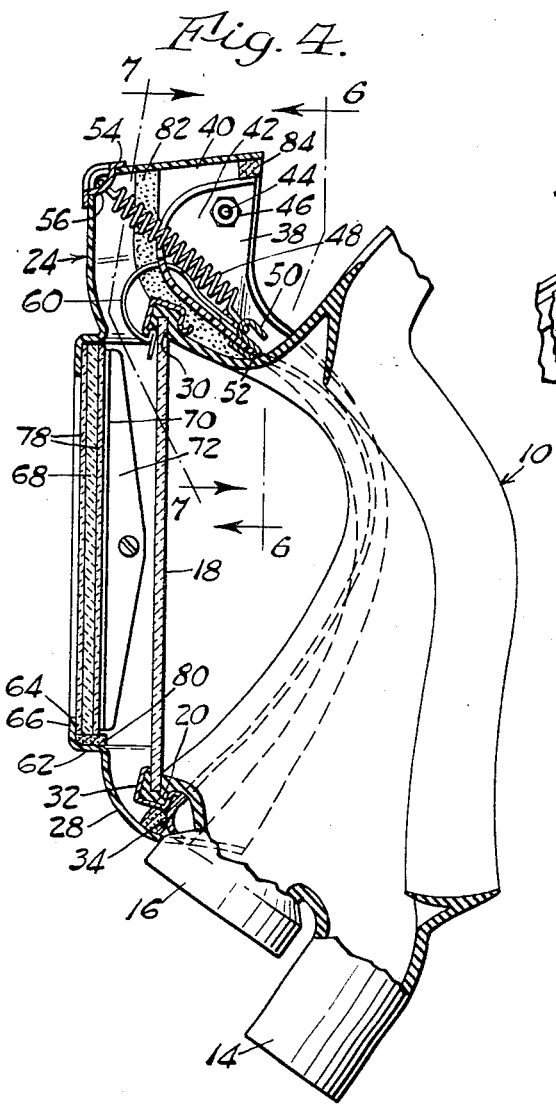
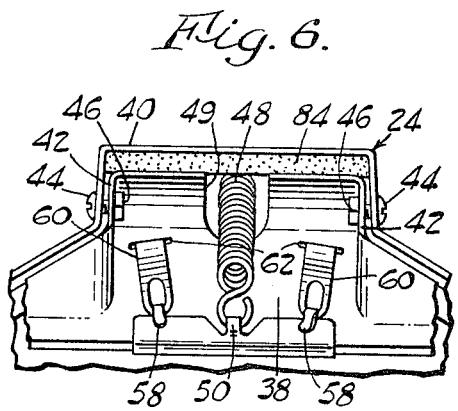
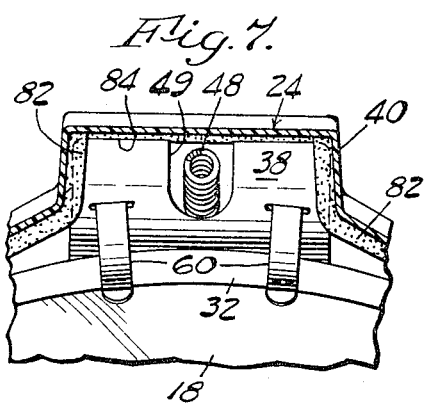
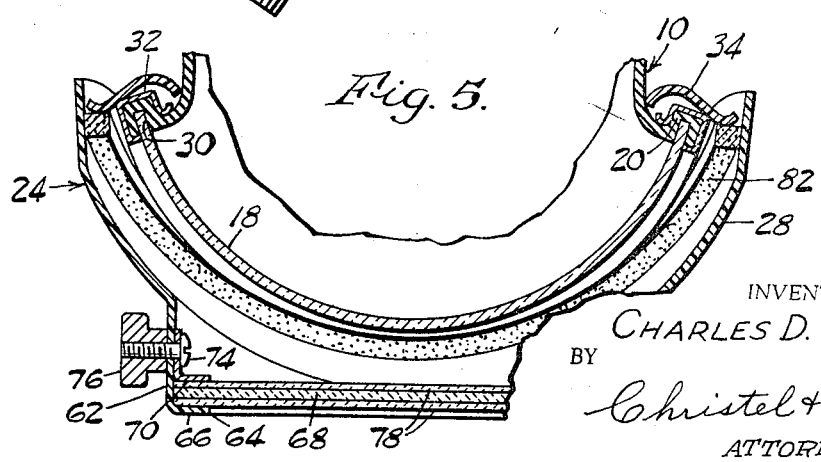
INVENTOR.
CHARLES D. CUPP
BY
Christel & Bean
ATTORNEYS.

United States Patent Office 3,276,034
Patented Oct. 4, 1966

3,276,034
PROTECTIVE SHIELD ATTACHMENT
FOR FACE MASKS
Charles D. Cupp, Lancaster, N.Y., assignor to Scott
Aviation Corporation, Lancaster, N.Y.
Filed Sept. 11, 1964, Ser. No. 395,654
11 Claims. (Cl. 2—8)

This invention relates to a protective shield attachment for face masks such as those shown in United States Patent Nos. 2,952,852, 2,952,853 and 2,996,722, for example. In a specific instance, the attachment of this invention is adapted to convert a face mask into a welding mask. However, the utility of this invention is not so limited.

In the welding industry there is a demand for an inexpensive lightweight welding mask that can be used in toxic atmospheres or even under water. A welding mask specifically designed to cope with such conditions might be quite expensive and impractical when considering the number of times that its use would be required by an individual owner. However, a simple and inexpensive welding shield attachment for an all-purpose face mask already in use would be desirable.

A protective shield designed as an attachment for an existing face mask, and designed to filter out the harmful light frequencies involved, should be easily installed and must completely block off light except through the filter thereof, desirably without greatly restricting the viewing lens of the mask. The shield attachment should be movable out of the normal line of sight through the face mask lens when not in use, and preferably should be urged into both its operative and inoperative positions, providing a tight light seal in the operative position, and reducing the chance of movement out of the inoperative position. Furthermore, it should be easily dismantable for decontamination, cleaning and the replacement of filters, and should be readily manipulated into and out of operative position when attached to a mask.

It is therefore, an object of the present invention to provide an inexpensive, lightweight, versatile device for converting a multi-purpose face mask into an optically shielded mask, without greatly restricting the viewing lens of the face mask.

It is also an object of my invention to provide a protective shield attachment for face masks which allows no light leakage in closed position, and which does not restrict the normal field of vision through the mask when in open position.

Another object of this invention is to provide a protective shield attachment which will fit existing face masks, which may be easily installed thereon without tools, and which is readily removable for normal use of the mask.

A further object of this invention is to provide a protective shield attachment having a balanced spring mechanism to hold it securely in both the open and closed positions.

A still further object of the invention is to provide a protective shield attachment in which the vision filters may be changed or replaced.

Still another object of the invention is to provide a protective shield attachment which can be connected to the face mask without a separate head harness.

An additional object of my invention is to provide the foregoing in an attachment which is relatively simple and inexpensive in construction while being durable and dependable in operation.

A protective shield attachment for face masks, constructed in accordance with my invention, is characterized in one aspect thereof by a generally annular mounting rim adapted to encircle a face mask lens opening and formed to engage behind a face mask lens frame, and a lens cover mounted on the mounting rim for movement between open and closed positions relative thereto.

The foregoing and other objects, advantages and characterizing features of the present invention will be apparent from the following detailed description of an illustrative embodiment taken in conjunction with the accompanying drawings showing the same, wherein like reference numerals denote like parts throughout and wherein:

FIG. 1 is a front elevational view of a full-face mask with a protective shield attachment of the present invention affixed thereto, the attachment being shown in this view in closed, lens-covering, protective position;

FIG. 2 is a side elevational view thereof;

FIG. 3 is a side elevational view of the shield-equipped mask shown with the lens cover pivoted into its open, inoperative position, out of the line of sight;

FIG. 4 is a vertical sectional view of the combined mask and shielding attachment, on an enlarged scale, being taken about along line 4—4 of FIG. 1;

FIG. 5 is a horizontal sectional view thereof taken about along line 5—5 of FIG. 4;

FIG. 6 is a fragmentary rear sectional view of the upper portion of the mask and the shielding attachment, illustrating the means for mounting the adapter onto the mask and pivoting its lens cover, being taken about on line 6—6 of FIG. 4; and FIG. 7 is a fragmentary front sectional view of the upper portion of the shielding attachment, particularly illustrating the means for clamping the shield to the face of the mask, being taken about on line 7—7 of FIG. 1.

Referring more particularly to FIGS. 1, 2 and 3, a face mask, generally designated 10 is illustrated equipped with the usual head straps 12 (only partially shown), an inlet tube 14, and an exhaust fitting 16. The mask also has a lens 18 mounted in an oval shaped unitary ridge 20 in the front portion thereof defining an opening 22. The protective shield of the present invention, generally designated 24, comprises a mounting section 26 and a pivotable lens cover 28, being affixed to the face mask 10 and arranged so that the lens cover 28 completely covers the lens 18 when in its lower, working position as shown in FIGS. 1 and 2, while providing an unobstructed view through the mask lens 18 when the lens cover 28 is in its raised, upper position as shown in FIG. 3. For certain uses, the lens cover 28 may be extended to also cover the exhaust fitting 16.

FIG. 4 and 5 show the construction of a portion of mask 10 including the lens 18 held in an inwardly opening groove or rabbet 30 in a ridge 20 of the mask around the lens opening, the lens being secured in place by a circumferential metallic rim 32 surrounding the outward portion of ridge 20 and constricting the material of the ridge over the edge of the lens 18. The mounting section 26 of the shield attachment 24 has an inner rim 34 for connecting it to the front of the face mask 10, the inner rim 34 encircling the mask 10 in the necked down area between the lens containing ridge 20 and the main body of the mask 10 with a cut out 36 in the inner rim 34 to provide clearance between the ridge 20 and the exhaust fitting 16 (FIG. 1). The inner rim 34 is of a rigid material, plastic or metal, and is positioned by drawing the flexible body of the face mask therethrough, the rim 34 engaging behind lens rim 32 and seating thereagainst.

For pivotally mounting the lens cover 28 on the mounting section, a cup-shaped upper end 38 of the inner rim 34 (FIGS. 4, 6 and 7), having parallel flat sides 42 extends beyond the surface of the mask 10. The lens cover 28 has an integral box-like section 40 with an open rear face substantially encompassing the upper end 38 of the inner rim 34 with a pair of bolts 44 extending coaxially through the opposite sides of section 40 and the respective sides 42 of the upper end of the inner rim 34, each held in place by a nut 44 threaded thereon. The bolts 44 permit pivotal movement of the lens cover 28 with respect to the mounting 26.

A coil tension spring 48 is so connected between the box-like section 40 of the lens cover cover 28 and the inner rim 34 of the mounting portion 26 that a two position, overcenter snap switch is formed holding the lens cover 28, in closed position, tightly down against the body of mask 10 as shown in FIGS. 1 and 2, or in open position, above lens 18 of the mark 10 as shown in FIG. 3. The spring 48 is anchored at its lower end to the mounting portion 26 below and behind bolts 44 by a central bent tab 50 on a U-shaped rear spring clip 52 which is in turn clamped under the upper end of the inner rim 34. A vertical slot 49 in the front wall of the upper end 38 of the inner rim 34 allows the spring 48 to be connected to an integral tab 56 extending from a front spring clip 54, overlying the outer front and upper faces of the box-like extension 40 of the lens cover 28, through a slot at the center of the corner defined by the faces that subtend the tab 56. In the position of FIGS. 1, 2 and 4 the tab 56 is forward and above the bolts 44 while in the position of FIG. 3, the tab is behind and above them. The positioning of the pivot posts 44 and the spring anchors 50 and 56 is such that the spring 48 attains its greatest length and therefore the greatest tension when the lens cover 28 is between the two end positions.

The rear spring clip 52 also has a pair of spaced side tabs 58 for respectively mounting a pair of apertured retaining clips 60. Each clip 60 extends through a slot 62 in the front wall of the upper end 38 of the inner rim 34 and is adapted to be snapped over the inwardly facing edge of the ridge 20 of the mask 10 to jointly hold the front clip 52 and the inner rim in place under tension.

A raised, square portion 62 in the front face of the lens cover 28, overlying the lens 18 of the mask 10 when the lens cover 28 is in the lowered position, has a square shaped aperture 64 therein, defined by a narrow continuous land 66 around the edge. An optical filter 68 is removably secured in place in the aperture 64 by a pair of L-shaped lens support brackets 70, each bracket having a flat leg 72 abutting a side wall of the raised portion 62 and connected thereto by a screw 74 extending through the leg 72 of the bracket 70 and the side wall into a thumb nut 76 on the outer side. Layers of protective material 78 which also can be filters are used to sandwich the filterd 68 between the inner face of the edge of the raised portion 62 and the brackets 70 while a narrow pad of shock absorbing material 80 may be positioned under the lower edge of the filter, resting on the raised portion 62 (as shown in FIG. 4).

Another resilient strip of plastic 82 lines the outer edge of the lens cover 28, extending up into the box-like section 40 along opposite sides thereof to form a seal between the lens cover 28 and the front of the mask 10, while a secondary sealing strip 84 is glued transversely across the upper inside wall at the rear of the box-like section 40, abutting the upper outside wall of the upper end of the inner rim 34, when the shield attachment 24 is in the working or operative position.

The face mask 10 can be used separately, simply by drawing it out of the rigid rim 34 of the protective shield attachment 26. There have been no modifications, such as holes cut in the mask, that would affect its air-tightness or limit its use for its intended functions. However, by a simple procedure the attachment 24 can be remounted on the mask 10 providing all the advantages of an optically shielded mask especially designed for use when working in an undesirable environment.

Accordingly, it is seen that my invention fully accomplishes its intended objects. Since many other embodiments of this invention may occur to those skilled in the art, it is to be understood that the embodiment of the present invention as shown and described is only illustrative of those many possible embodiments and is not intended as limitation of the scope of the invention.

Having fully disclosed and completely described my invention, and its mode of operation, what I claim as new is:

1. In combination with a face mask having a body of flexible material, a transparent lens, and means mounting said lens over an aperture in said body, said mounting means forming a laterally projecting ridge around said lens, a protective shield attachment comprising a lens cover and a mounting rim, said mounting rim removably encircling said face mask behind said ridge and being held in position thereagainst, at least in part, by said mask body.

2. An attachment as recited in claim 1, together with resilient means connected to said rim and releasably hooked over said ridge whereby said rim is held against said ridge.

3. An attachment as recited in claim 1, together with an optical filter mounted in said lens cover for blocking selected light frequencies, said lens cover being pivotally mounted on said rim for movement between a closed position in which said lens cover completely encloses said lens and an open position in which vision through said lens is not obstructed by said filter, together with means yieldably holding said lens cover in either of said position.

4. An attachment as recited in claim 3, wherein said last-named means comprises an overcenter tension spring extending between said rim and said lens cover and connected thereto so that the extended length of said spring is less in either of said positions than in a position therebetween.

5. An attachment as recited in claim 3, wherein said filter overlies a major portion of said lens when said lens cover is in said closed position.

6. A protective shield attachment for face masks of the type having a body, a lens mounted on the body, and a laterally projecting frame around the lens, said attachment comprising a generally annular mounting rim adapted to encircle a face mask lens opening and formed to engage behind a face mask lens frame, and a lens cover pivoted on said mounting rim for movement between open and closed positions relative thereto.

7. A protective shield attachment as set forth in claim 6, together with overcenter spring means biasing said lens cover to either of said positions.

8. A protective shield attachment as set forth in claim 6, wherein said lens cover includes an optical filter and an opaque body, said lens cover body substantially encircling and enclosing said mounting rim when said lens cover is in said closed position.

9. A protective shield attachment as set forth in claim 8, together with resilient sealing material carried by said lens cover body and engaging said mounting rim for sealing the space therebetween when said lens cover is in said closed position.

10. A protective shield attachment for face masks comprising generally annular mounting rim having an oval opening for receiving a face mask lens and engaging behind a face mask lens frame, said rim being of generally semi-cylindrically curved form, and a lens cover having an opaque body of generally semi-cylindrically curved form to substantially enclose said mounting rim, a raised generally rectangular optical filter frame on said body, and an optical filter in said lens cover frame, said lens cover being mounted on said rim for movement between open and closed positions relative thereto.

11. A protective shield for face masks comprising a lens cover having an opaque body of generally semi-cylindrically curved form adapted to overlie and substantially enclose a similarly curved face mask lens, a gradually rectangular optical filter frame on said body, and means for detachably and pivotally mounting said lens cover body on a face mask.

References Cited by the Examiner

UNITED STATES PATENTS

| | | | |
|---|---|---|---|
| 2,719,972 | 10/1955 | Kelly | 2—8 |
| 2,923,944 | 2/1960 | Lindblom | 2—14.8 |
| 3,147,487 | 9/1964 | Hoeftman | 2—8 |

JORDAN FRANKLIN, *Primary Examiner.*

J. R. BOLER, *Assistant Examiner.*